US012106627B2

(12) United States Patent
Goldberg

(10) Patent No.: US 12,106,627 B2
(45) Date of Patent: Oct. 1, 2024

(54) GAMING TABLE DEVICE AND METHOD FOR USE AND SUPERVISION OF GAME PLAY

(71) Applicant: Centerfield Nine Corporation, Las Vegas, NV (US)

(72) Inventor: Andrew L. Goldberg, Las Vegas, NV (US)

(73) Assignee: Centerfield Nine Corporation, Las Vegas, NV (US)

( * ) Notice: Subject to any disclaimer, the term of this patent is extended or adjusted under 35 U.S.C. 154(b) by 0 days.

(21) Appl. No.: 17/724,060

(22) Filed: Apr. 19, 2022

(65) Prior Publication Data

US 2022/0335772 A1 Oct. 20, 2022

Related U.S. Application Data

(60) Provisional application No. 63/176,429, filed on Apr. 19, 2021.

(51) Int. Cl.
*G07F 17/32* (2006.01)

(52) U.S. Cl.
CPC ........ *G07F 17/322* (2013.01); *G07F 17/3239* (2013.01); *G07F 17/3293* (2013.01)

(58) Field of Classification Search
CPC . G07F 17/322; G07F 17/3239; G07F 17/3293
See application file for complete search history.

(56) References Cited

U.S. PATENT DOCUMENTS

| | | | | |
|---|---|---|---|---|
| 5,743,800 | A * | 4/1998 | Huard | G07F 17/32 463/16 |
| 6,305,689 | B1 | 10/2001 | Webb | |
| 9,569,924 | B2 | 2/2017 | Snow | |
| 9,889,371 | B1 | 2/2018 | Knust | |
| 10,586,429 | B1 | 3/2020 | Schueneman | |
| 10,629,025 | B2 | 4/2020 | Chun | |
| 10,650,643 | B1 | 5/2020 | Lemanski | |
| 10,744,397 | B2 | 8/2020 | Shigeta | |
| 10,755,531 | B1 | 8/2020 | Buten | |
| 10,909,815 | B2 | 2/2021 | Donadio | |
| 10,943,440 | B1 | 3/2021 | Weiss | |
| 11,045,715 | B2 | 6/2021 | Hall | |
| 11,127,260 | B2 | 9/2021 | Scott | |
| 11,263,873 | B1 | 3/2022 | Le | |

(Continued)

*Primary Examiner* — Kevin Y Kim

(74) *Attorney, Agent, or Firm* — Forsgren Fisher; Daniel A. Tysver; James M. Urzedowski

(57) ABSTRACT

A system and method are presented that provide visual indicators to allow for multiple rule sets to be used simultaneously on a gaming table. In one embodiment, different players playing a card game against a common dealer hand can elect different rule sets for play. Selection can be based upon the placement of bet tokens on different wagering areas at their gaming position at the table, with different wagering areas representing differing rule sets. Visual indicators are then used to record the rule set selection. In certain games, players can change from one rule set to another during the play of a hand, requiring a change in the visual indicator. Blackjack can be played pursuant to fast or traditional rule sets. Virtual games using fast blackjack rules can be created also using visual indicators that reflect a chosen rule set.

20 Claims, 10 Drawing Sheets

(56) References Cited

U.S. PATENT DOCUMENTS

| | | | | |
|---|---|---|---|---|
| 2001/0028147 | A1* | 10/2001 | Ornstein ............ | A63F 3/00157 273/292 |
| 2002/0008356 | A1* | 1/2002 | De Keller ........... | A63F 3/00157 273/292 |
| 2007/0117604 | A1* | 5/2007 | Hill ..................... | G07F 17/3258 463/16 |
| 2016/0287977 | A1 | 10/2016 | Payne | |

* cited by examiner

GAMING TABLE DEVICE AND METHOD FOR USE AND SUPERVISION OF GAME PLAY

CROSS-REFERENCE TO RELATED CASES

The present application claims the benefit of U.S. Provisional Application Ser. No. 63/176,429, filed on Apr. 19, 2021. This priority application is hereby incorporated by reference in its entirety.

FIELD OF THE INVENTION

The present application relates to the field of improved gaming apparatus.

BACKGROUND OF THE INVENTION

Blackjack Efficiency Issues

Blackjack, sometimes known as Twenty-One, is the most popular house-banked casino table game, according to revenue figures from jurisdictions such as Nevada and New Jersey. It is likely that every casino with a license to offer house-banked table games has one or more blackjack tables on its gaming floor. For example, in 2021, there were an average of 1957 active Twenty-One tables in Nevada, while the table game with the second-most tables, Roulette, averaged only 423 tables. Further, twenty-one was the only table game to generate over $1 billion in revenue in Nevada during 2021.

Despite its lead in total tables and revenue, Blackjack is not the most efficient game. In 2021 in Nevada, Baccarat generated $939 million from just 370 tables, more than $2.5 million in revenue per table. Roulette generated a bit over $1 million per table. Blackjack, by contrast, generated about $578,000 per table.

The revenue generated by a blackjack table in a year, day, or hour is a function of the total amount of wagers made, which itself is heavily influenced by the number of resolved (that is, not resulting in a tie) hands played within the time period. Casinos have employed many specific procedures and devices for the sole purpose of speeding up the game and increasing the number of hands played in a given time period.

For example, blackjack was historically played with a single standard deck of 52 cards. This required dealers to pause the game for shuffling every few hands. During the shuffle, no wagers can be made, and no hands are played, making it a zero-revenue "dead time" for the casino. Casinos adapted by dealing from a shoe of 6 or 8 decks of cards, vastly increasing the number of hands that could be played before another shuffle was required. Shuffling 6 or 8 decks takes longer than shuffling just one, however, the reduced frequency of shuffles, overall, reduced the length of the "dead time" and enabled more hands and more wagers per hour.

Technological improvements have also increased the efficiency of blackjack tables. Automated shuffling machines, for example, eliminated manual shuffling altogether and therefore eliminated all "dead time" related to shuffling. This enables more hands to be dealt and more wagers to be made per hour, which typically boosts revenue enough to exceed the cost of the machine.

Another example is the practice of dealing all player hands face-up, which is now nearly universal. Dealing the cards up allows the dealer, who spends hours every workday summing up blackjack hand point totals, to adjudicate each hand much faster than when players look at their cards privately. The dealer can collect busted hands, or pay out winning hands, without delay when the cards are face up during the entire game, which again enables a higher number of hands to be dealt and wagers to be made every hour.

Even seemingly tiny speedups can add up quickly, given the 24-7-365 nature of most casinos. Most blackjack tables today contain an embedded electronic "eye" technology that, when the dealer's exposed card is a 10, Jack, Queen, King or Ace, can recognize and signal whether the face-down card in the dealer's hand completes a natural blackjack. Eliminating the manual peek by the dealer may save just 3 seconds or so each time, but if 15 manual peeks are required in a typical hour of play, a table operating 24/7 will waste over 4.5 days just peeking every year.

Further advancements to increase the velocity of dealing and administering blackjack are highly desired by casinos, as they generally lead directly to increased revenue, demonstrated above. But increasing hands played per hour is not the only way to increase efficiency, as increasing the number of players is also effective. Despite blackjack's popularity, many people avoid it because they perceive it to be a difficult game to learn and play optimally. Unlike games like roulette or craps, and also unlike slot machines, blackjack requires players to make one or more strategic decisions during every hand. A roulette or craps player has no ability to affect his or her odds of winning, positively or negatively. The blackjack player, on the other hand, can absolutely lower his or her chances of winning by making sub-optimal strategic decisions. As such, many potential gamblers are intimidated by blackjack, or embarrassed to play publicly where their lack of knowledge may be apparent.

One prior art technique to improve the efficiency of blackjack tables is found in U.S. Pat. No. 6,305,689, which proposed a Blackjack derivative card game that is incompatible with standard Blackjack rules. Patent '689 deviates significantly from conventional blackjack through its alternative adjudication rules—"when the dealer busts, every player receives a push"—and when the dealer gets a new hand while players retain their original hands—"[i]n this case, only the dealer would receive a new hand"—indicating that some hands survive into the next round of play, which is unheard of in blackjack.

Other Games and Gaming Tables

Baccarat tables have two distinct primary wagering areas per gaming position, usually labeled "Player" and "Banker." Baccarat players do not have their own individual hands, as a single Player hand is shared among all players, and the Banker hand is the sole opponent. Player and Banker are, therefore, simply two sides of a single event, just like "heads" vs "tails" of a coin flip. Further, Baccarat has no strategy or decisions for the player(s) to make. Whether or not to take an additional card is entirely prescribed by the rules of the game. The human players (the wagerers) cannot impact the game, the value of the hands, or the determination of the winner, in any way. The order and rules of play are unchanged regardless of selection of Player or Banker. The game of Baccarat is, like a coin flip, an independent event that the player cannot influence or apply any strategy to.

The "Pass" and "Don't Pass" wagers on a craps table are similar, as they are directed towards the result of an event that the players cannot influence nor apply strategy. Roulette expands this same concept, offering 36 distinct numbers to bet on, but again, the event is entirely independent of the wagers and are not influenced by them, or affected by any strategy.

Many existing casino table games, including blackjack games, include an optional "side bet." Access to the side bet is only permitted when the player is playing the primary game, and participating in the side bet does not alter the play of the primary game. The side bet is an additional, secondary wagering opportunity, not an alternative to the primary game. choice. Most side bets do not have an opponent, instead, the cards are compared to a paytable of winning combinations. For example, the popular "Lucky Ladies" side bet simply pays when the player's first two cards equal 20, or contain at least one Queen, regardless of the contents of the Dealer hand. "Pair Square," another popular game, is also very simple: if the player's first two cards are a pair, the bet is a winner.

Some other games that may have been offered by a casino at some point, such as Caribbean Blackjack, Double Twist Blackjack, and Twin Blackjack, all have two blackjack wagering areas (plus possibly a side bet wagering area). These games require two wagering areas because players get two distinct blackjack hands, not because the players have a choice of which game to play. The rules of the game do not change based upon the placement of the bets. The table itself is capable of offering just a single game at a time.

SUMMARY OF THE INVENTION

The present invention identifies the player decision process as another major source of "dead time" at a blackjack table. Every hand, the dealer must wait for each player to make one or more decisions whether to "hit", that is, add another card to his or her hand, or to "stand." Many times, this decision is nuanced and difficult, and players tend to deliberate for extended periods of time, often consulting other players or the dealer while seeking the optimal choice. The present invention eliminates most, or all, of these hit or stand decisions, along with the dead time they occupy. Players will still hit and stand, however, they will do so with full knowledge of the final point value of the dealer's hand, so that the correct choice is always known, without any uncertainty or risk.

But eliminating important decisions from blackjack is not desirable to all players, many of whom prefer to play in the conventional manner. It is therefore highly unlikely that a casino would choose to abandon conventional blackjack entirely. A casino can offer both methods by establishing a gaming table entirely dedicated to each method of playing blackjack. A problem arising from this scenario is that the casino must double its resources in order to offer conventional blackjack and this speedier method of blackjack, which, for the purposes of this patent application, we shall call "slow blackjack" and "fast blackjack." Casinos have constraints on physical space and on employee resources. Dedicating a table specifically to slow blackjack and one to fast blackjack means two dealers are necessary, which would also double the associated supervisory and surveillance resources. This is likely to either increase costs or require the replacement of a gaming table that was previously dedicated to offering a different game.

In a preferred embodiment, however, the casino would utilize a novel gaming table specifically designed to accommodate all player preferences, including players who want to alternate between methods. The gaming table is combined special-purpose set of materials or apparatus that visually indicate each player's original choice of method. This allows the dealer, the supervisors, and the surveillance personnel to always be sure of which method the player originally chose. In this way, the casino does not have to utilize a second table or increase its personnel resources. By referring to these visually indicating materials or apparatus, the dealer can confidently deal both methods of the game at the same time, at the same table.

This application also recognizes that gambling in the United States has recently moved online, and such online gambling is growing rapidly. In New Jersey, for example, Internet Gaming Win exceeded $1.36 billion in 2021, a 40% increase over the prior year. The application also describes an embodiment of the novel blackjack method that is designed to be played on a computer, server, or group of computers, such as on a computer or mobile device connected to the Internet.

DETAILED DESCRIPTION

Basic Method for Increasing Efficiency Using Fast Blackjack

Some embodiments of the present invention are directed to the process of dealing and administering a fast blackjack game within a casino environment. In fast blackjack, each round of blackjack commences in conventional fashion. At least one player initiates a wager, the dealer deals two cards to each player, including its own hand, to which one card is dealt face-down. If the other, face-up card is such that a natural blackjack is possible, the dealer shall check whether the face-down card completes such a natural blackjack. If the dealer does not start with a natural blackjack, the game continues. In some embodiments, players may make "insurance" wagers prior to the dealer's check that are adjudicated after the dealer completes the check, just like in conventional blackjack.

The dealer starts by addressing its own hand, exposing the face-down card, and completing the hand according to conventional blackjack procedures, in full view of all players, as is typical when it is the dealer's turn to complete and finalize its hand. After the dealer's hand has been finalized and its final point total is known by all active players, the dealer shall address each active player hand. At this point, because the dealer's hand is known by the player, there can be no confusion or uncertainty about the optimal choice between hitting or standing. All strategy that is based on the probabilities of possible future events has been eliminated. Very simply, if the player's hand's current point total exceeds that of the dealer's hand, "stand" is the proper decision. If it is less, the only proper decision is to "hit" until the hand's point total exceeds that of the dealer's hand. The dealer can simply play out the player hands without waiting for players to ponder over decisions and make the associated hand signals, eliminating the "dead time" these actions normally occupy (hand signals are essential in a casino environment because games are observed remotely by surveillance personnel who rarely have access to any audible signals).

Additional details concerning this method for fast blackjack, and the process for combining fast blackjack and traditional or slow blackjack, are set forth below.

Table for Multiple Methods of a Blackjack Game

Figure 1:
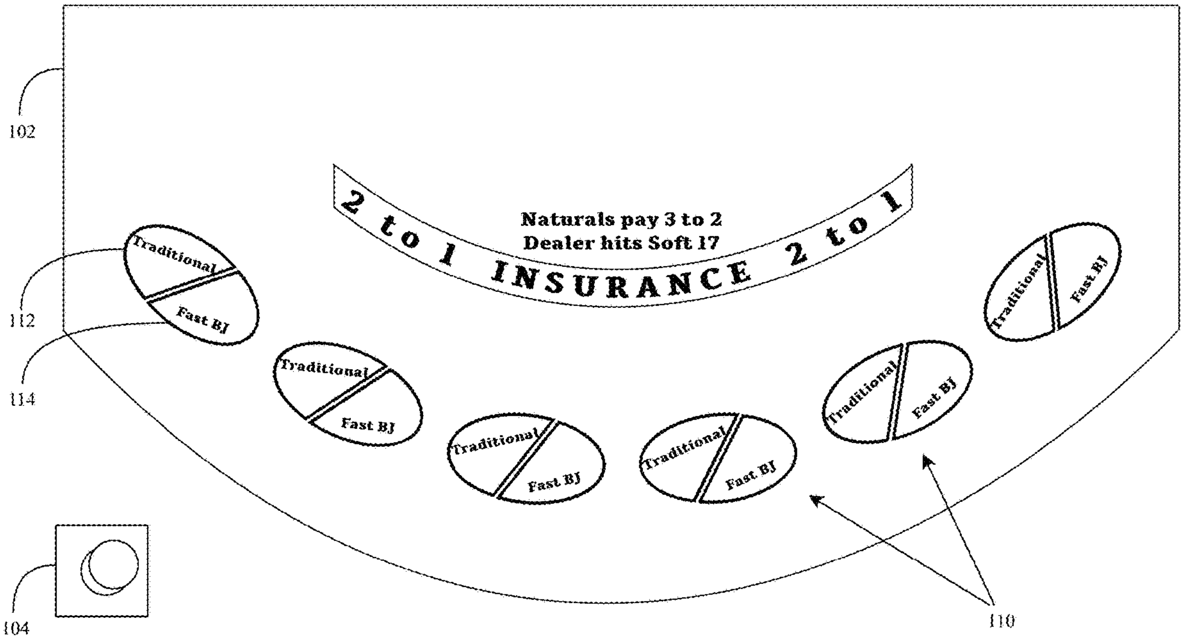
FIG. 1 is a schematic view of a top surface of a gaming table that offers multiple wagering areas at each player position, and related surveillance apparatus.

A casino gaming table 102 (or a portion thereof) is shown in FIG. 1. The table 102 can be the size and dimensions of a typical blackjack table, and is generally placed in a casino "pit" area in range of the casino's table game surveillance apparatus 104. Such apparatus 104 typically consists of a plurality of video cameras, each of which are positioned to record one or more aspects and participants of the game under its watch, such as the dealer, the players, the chips representing wagers, and the cards, dice, wheels, tiles, or other devices used to play the game and determine a winner. Each camera apparatus 104 records its video capture on videotape, or, more likely, as a digital video file on a computer or networked storage system. Camera feeds are usually watched in real-time by surveillance operators, but may also be watched at a later time, and such feeds can generally be referenced and replayed upon casino personnel request.

In addition to the surveillance apparatus 104 and the employees assigned to watch this particular table, the game is staffed by a dealer who, in most casino environments, is overseen by one or more pit supervisors, floorpersons, and/or casino managers, who are responsible for monitoring the game, and who also "rate" the players (record the size of each player's wagers during their gaming session), resolve minor disputes, facilitate refilling the dealer's "rack" (collection of wagering chips available for paying winning wagers), and perform other tasks to keep the table running efficiently and smoothly. Surveillance personnel also monitor the games via the feeds generated by the cameras or other devices 104.

Figure 2:
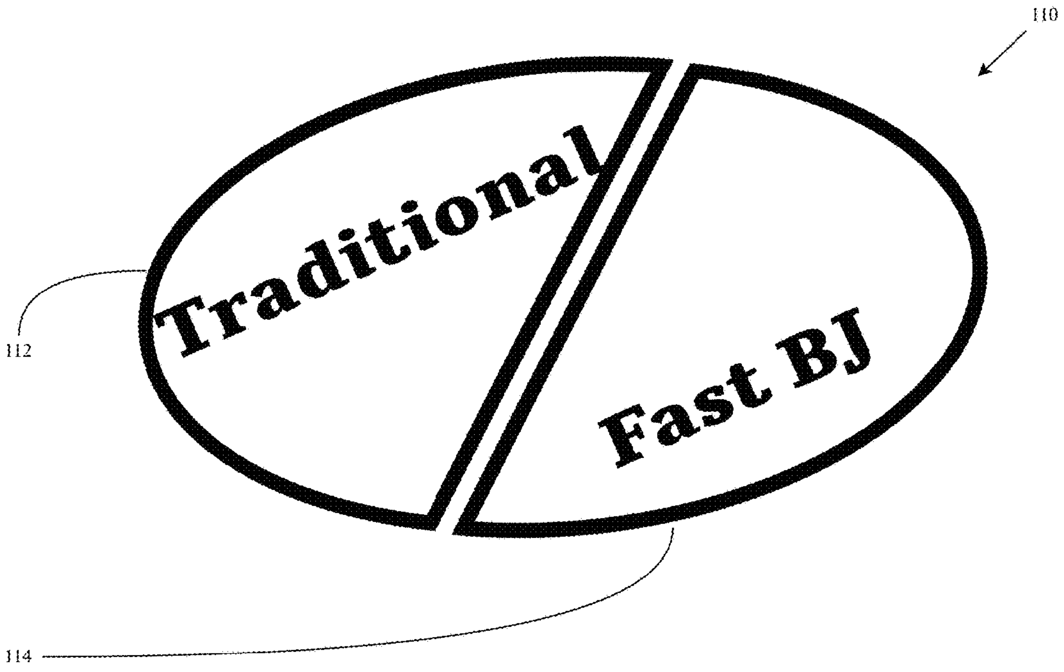
FIG. 2 is a magnified view of one of the multiple wagering areas of FIG. 1.

This gaming surface of table 102 is noticeably different from a standard blackjack table's gaming surface by the existence of two prominent, but distinct, wagering areas 112, 114 per gaming position 110. These wagering areas comprise markings on the top surface of the table 102 and can be made by printing directly on the surface, by adhering or affixing materials to the surface, or through any other means for creating such markings. In one embodiment, the wagering areas 112, 114 are of equal size and complementary shape (such as equal portions of an oval). The wagering areas 112, 114 of FIG. 1 are placed side-by-side horizontally, and use text and/or graphical shapes as differentiators. FIG. 2 shows these two wagering areas 112, 114 in more detail. The markings that define these wagering areas 112, 114 visually identify different rule sets by which the game can be played. By choosing one of these two, distinct wagering areas 112, 114 when placing wagering chips or tokens, each player signals to the dealer and other observers the method of playing blackjack in which the player wishes to participate. The elected rule set will then govern the play for that player.

Figure 3:
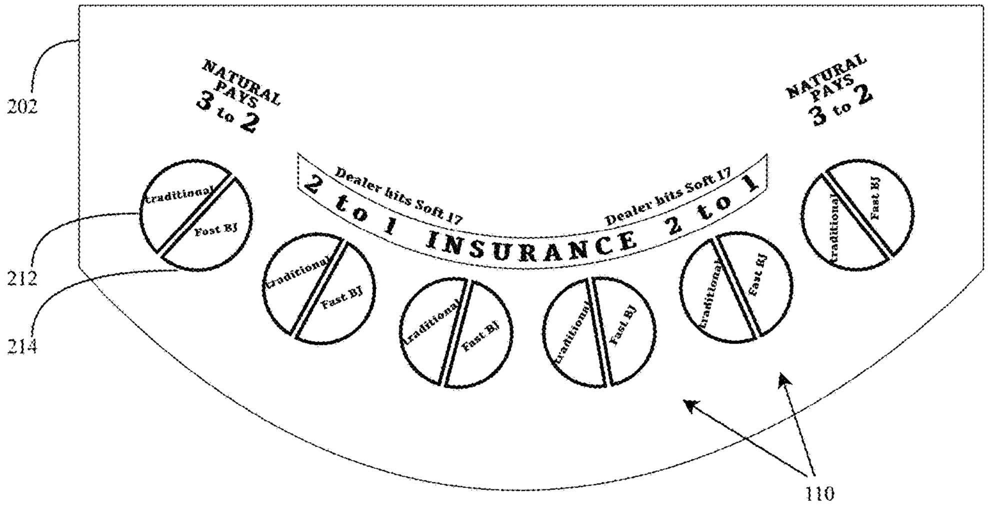
FIG. 3 is a view of the top surface of an alternative embodiment of the gaming table of FIG. 1.
Figure 4:
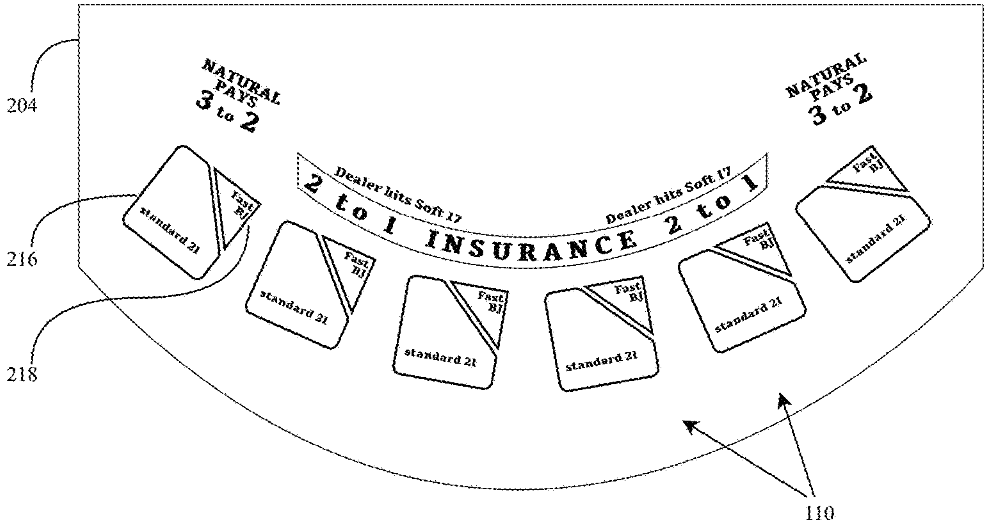
FIG. 4 is a view of the top surface of a second alternative embodiment of the gaming table of FIG. 1.
Figure 5:
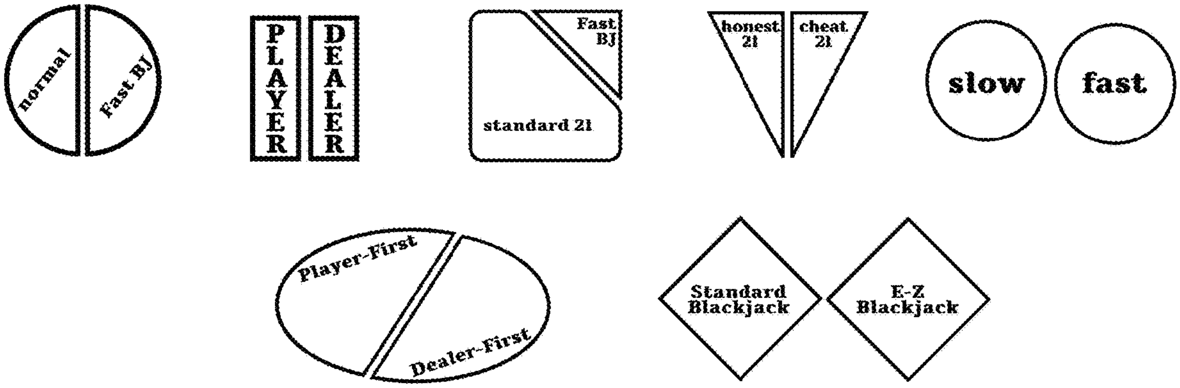
FIG. 5 shows multiple magnified views of alternative wagering areas of the type presented in FIG. 2.

In other embodiments, however, one of the wagering areas may be larger or more prominent than the other, or the wagering areas may be positioned vertically, or diagonally, or in an alternative shape. The wagering positions may be labeled, in order to identify the corresponding game, or such wagering positions could be distinguished by color, shape and/or position, or a combination of multiple differing traits In FIG. 3, a first alternative table 202 is shown that utilizes a different configuration of wagering positions 212, 214 that comprise complimentary halves of a circle, rather than the oval shapes used on table 102. FIG. 4 shows a second alternative table 204, where the wagering areas 216 and 218 are complimentary, but they are not the same size nor the same shape. FIG. 5 displays more examples of possible embodiments for pairs of wagering areas to be presented at each gaming position 110, although the options shown in FIG. 5 should not be considered to be exhaustive. There is no specific requirement that the wagering areas, when viewed together at a gaming position 110, create a specific shape or be complimentary. In some embodiments, the wagering areas mirror each other and in others they do not. Text labels corresponding to each wagering area may be left to the casino to implement in a fashion they prefer, but preferably the text will provide a sufficient indicator to the player as to which gaming rules will apply based upon their bet.

Returning to FIG. 1, play begins when one or more players will make a bet. In the preferred embodiment, bets are made by placing wagering chips on one of the wagering areas 112, 114. The wagering chips can be referred to generally as a bet tokens. In a typical casino setting, bet tokens comprise one or more round chips, such as clay or metal chips, and are used in lieu of legal currency within the casino. A bet token may also be rectangular, such as a gaming plaque that is frequently used for large amounts in a casino. In the context of this disclosure, a bet token may also comprise legal currency. A bet token can be any marker indicating that a bet has been placed and, typically, the amount of the bet. The choice of wagering areas 112, 114 onto which the bet tokens are initially placed communicates to the dealer and to the observers (supervisors and surveillance) which blackjack "speed" (slow or fast) each active player has chosen. Again, the terms slow or fast are for use in the present description but would not be used in a commercial context.

Due in part to the unique nature of blackjack, with additional mid-game wagers (from "doubling down") and additional hands dealt mid-game (from "splitting") and additional chips (dealer tips) placed on the gaming surface, chips and cards placed on table 102 frequently get moved or displaced from their original location. This can be seen in FIG. 6, where table 102 is shown in a starting state— before any cards have been dealt. The player at gaming position 310 initiated a "Fast BJ" wager by placing chips 312 in the wagering area 114 corresponding to that method. Gaming position 310 is shown enlarged in FIG. 7.

Figure 6:
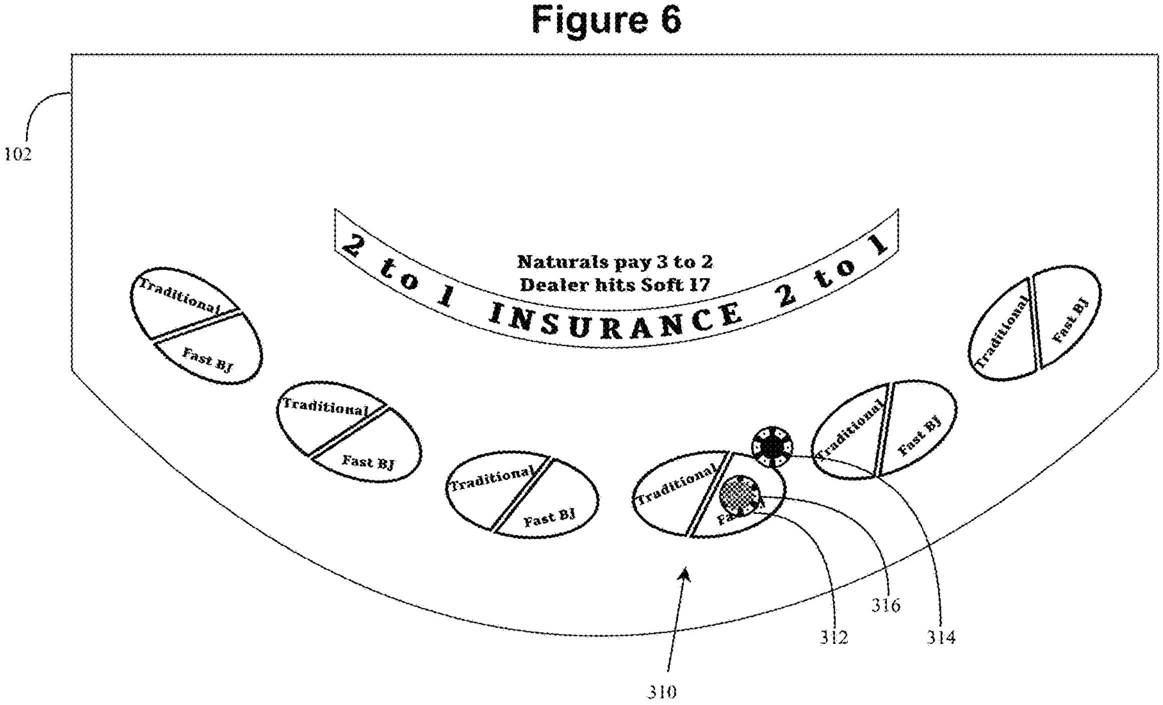
FIG. 6 is a view of the top surface of the gaming table of FIG. 1 in use.
Figure 7:
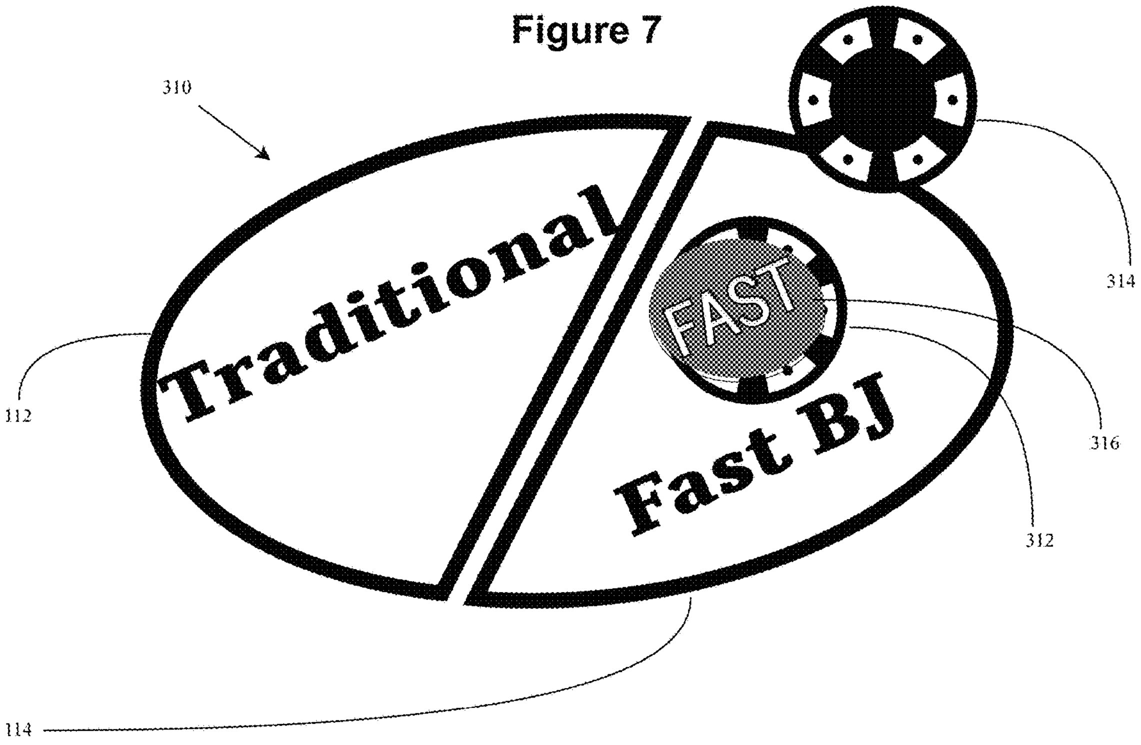
FIG. 7 is a magnified view of one of the multiple wagering areas of FIG. 6.

The player also placed additional chips 314 on the gaming surface, located closer to the dealer, as is traditionally performed in blackjack to represent a gratuity or "tip" designated for the dealer. Typically, it is intended that the tip shall start as second wager on the same player hand, with the expectation that the final tip to be collected by the dealer at the conclusion of the game shall be comprised of the game's payout, if any. The dealer, responding to the wager, has placed "lammer" 316 on the player's wager to provide a visual indicator of the game choice that will persist if the wager is moved or displaced. The lammer 316 can take the form of a disk or other physical marker that can be placed on to the wagered chips 312 to confirm the game selection of the player. The lammer 316 shown in FIGS. 6 and 7 is but one example of a visual indicator that can be used to identify the rule set selected by the player for the game.

Figure 8:
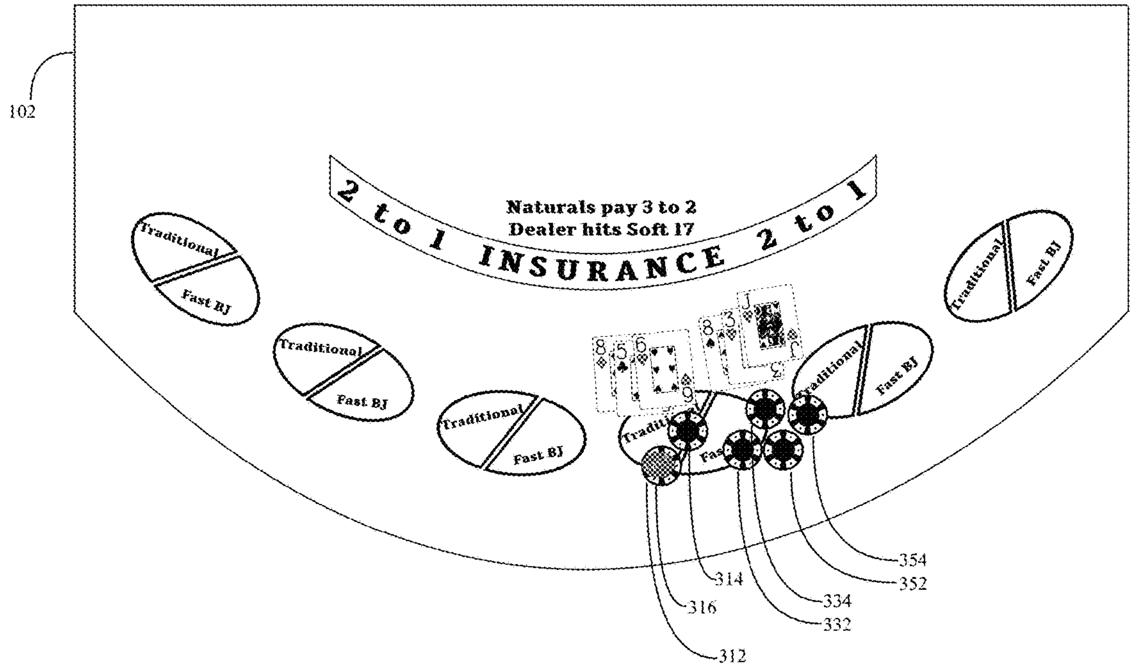
FIG. 8 is a view of the top surface of the gaming table of FIG. 6 at a later time.

FIG. 8 shows a later state of the table 102. Original wagers 312 and 314, along with lammer 316, are still on the gaming surface but have been moved in order to facilitate additional wagers and a second hand. In this game, the player was initially dealt two 8 cards, which the player opted to split into two distinct hands, as is typically allowed when the player's first two cards are of equal value. Splitting obligates the player to match the original wager with another wager 332, including the gratuity 334. On a split, the dealer will place another lammer 316 on the bet associated with the second hand, although this is not shown in FIG. 8 as is explained immediately below. The dealer dealt a second card to each hand, leaving one hand with a point value of 11 and the other hand with a point value of 13. With 11 being a very popular hand to double-down on, the player opted to do so, which once again required the player to match the original wagers with chips 352 and 354. Doubling-down automatically grants one additional card to the hand, which in this case was a Jack card to make 21. Because the player chose to double-down, no more hits are allowed (even if the player had not achieved a 21), so the lammer representing "Fast Blackjack" was removed from this hand, so that the dealer does not consider hitting the hand later in the game. As is evident from the diagram, original wagers 312 and 314 were moved to make room for a total of 6 chips and two distinct hands. If the dealer did not have the lammer 316 as a reference and relied only on the current position of the chips, the dealer would likely mistake the 8-5 hand as a "Slow Blackjack" hand (based upon its position on the table 102) that was not entitled to a hit after the dealer completes its own hand. However, the persistent lammer 316 confirms that in fact, this hand has always been a "Fast Blackjack" hand, which is entitled to hit, which the dealer dealt as a 6 card to make a point total of 19. The lammer 316 functions as the visual indicator of the selected rule set to surveillance and supervisory personnel, who might assume the dealer made a mistake by hitting the hand, if their evaluation was based only upon the location of the player's chips.

While the primary embodiment discussed within this patent application is to utilize the table to offer two methods of blackjack, as discussed, it is anticipated that such a table could also be used in similar fashion to offer two entirely different gambling games, in a scenario when both games allowed all active players to compete against the same common hand.

Apparatus for Visually Confirming Players' Choices

On a standard blackjack table, movement of chips or tokens does not cause issues, because there is no question regarding which method the player has chosen to play. Table 102, however, offers multiple methods of play, and chips or tokens that are displaced from the original wagering area will not properly communicate the method of play chosen by the player. This means that game observers cannot rely on the current location of chips or tokens. Instead, a solution that will persist even if the chips or tokens get moved around is needed. Further, reliance solely on the chips or tokens is a common avenue for fraud or cheating from players, such as those who would try to change the method of play after the cards have been dealt.

A persistent visual indicator dedicated to the specific purpose of confirming and communicating each player's choice of blackjack method is necessary. In the embodiment shown in FIGS. 6-8, the dealer placed a plastic or clay marker, lammer 316, on top of all wagering chips. In other words, the dealer establishes a visual indicator at or near adjacent the gaming position 110 to reflect the player's rule selection by physically placing the lammer 316. A visual indicator that is either at or near a gaming position 110 is considered to be adjacent to that gaming position 110. As shown best in FIG. 7, lammer 316 is imprinted with text, icon, or symbol indicating the player's game choice. Such lammers 316, in one embodiment, could also differ by color and even shape to further distinguish the method choices from one another. Thus, a lammer 316 with the "fast" text would be placed on bets made in wagering area 114, while a different lammer indicating "traditional" or "slow" would be placed on bets made in wagering area 112.

Figure 9:
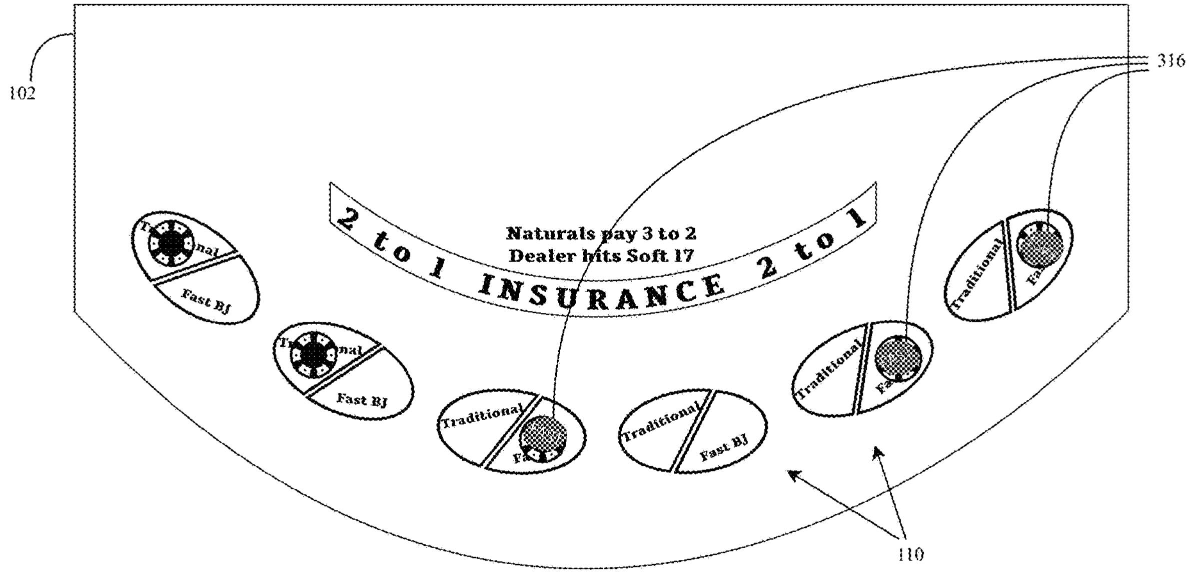
FIG. 9 is a view of the top surface of the gaming table of FIG. 1 with five player positions in use.

In other embodiments, however, the casino procedure might be to place a lammer only on chips designated for one of the rule sets, where the presence of the lammer is the visual indicator for the selection of that rule set and the absence of the lammer would be the visual indicator for the other rule set. This is shown in FIG. 9, where table 102 is shown with bets having been placed in five of the six gaming positions 110. In this figure, the lammers 316 are a visual indicator of the selection of fast blackjack, while no lammer indicates traditional or slow blackjack. In this figure, a first set of three gaming positions 110 have bet tokens in the fast blackjack wagering area 114, and these are marked with lammer 316. A second set of gaming positions 110 have bet tokens in the traditional blackjack wagering area 112, which are not marked by a lammer 316. It is imperative that the lammers 316 be clearly visible by the casino's surveillance apparatus, as their presence, or lack thereof, are relied upon to communicate to the surveillance personnel and supervisors which wagers correspond to each method. In other embodiments, the dealer may first deal the cards, then place the appropriate lammers on the cards themselves, rather than the chips.

Figure 10:
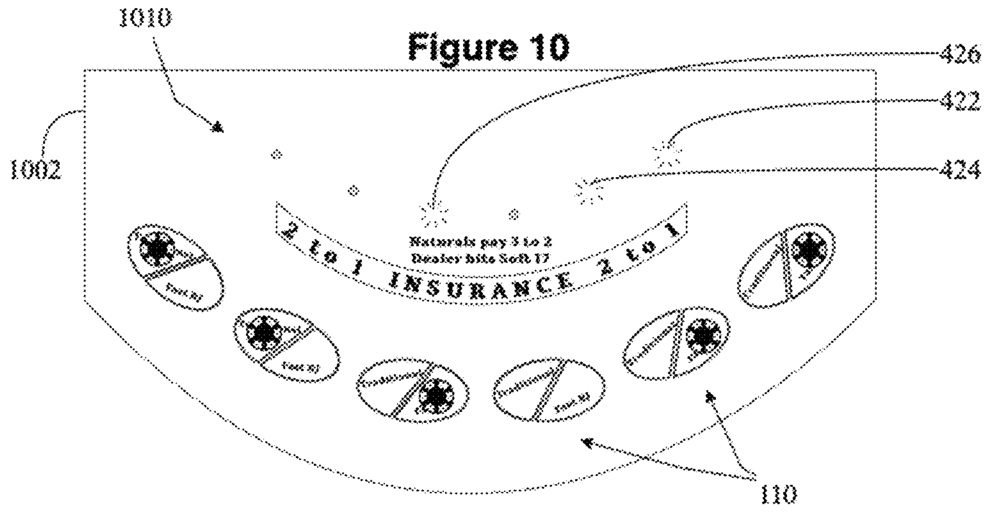
FIG. 10 is a view the top surface of a different embodiment of the gaming table of FIG. 9.

In the alternative embodiment shown in FIG. 10, a table 1002 is shown that has a plurality of lights 1010 integrated therein. At least one light is associated with each of the different gaming positions 110. The light or plurality of lights at a gaming position acts as the visual indicator of the chosen rule set, and therefore usurps the lammer's role of confirming and communicating the players' choice of blackjack methods. In other words, the visual indicator is established at the gaming position 110 by turning on the light at the gaming position 110. In FIG. 10, three lights 1022, 1024, and 1026 indicate that the three players in the first set of gaming positions 110 have placed a bet on the fast-wagering area 114. The lights 1010 are not lit for the second set of gaming positions, where players have placed their bet on the traditional or slow wagering area 112, or where no player is currently playing. Alternatively, a different color of light 1010 is illuminated at a gaming position 110 based upon the type of game play selected by the player. A light that can change its color to indicate the type of play can be considered a multi-mode indicator, where one color indicates a first mode of play (which is present at the first set of gaming positions), while a second color indicates a second mode of play (present at the second set of gaming positions). FIG. 10 shows the lights 1010 being built into the gaming table at the various gaming positions 110. In other embodiments, the lights 1010 would be placed on the table near each gaming position 110. In some embodiments, multiple lights can be present at each gaming position 110 to reflect the possibility that a hand is split and two different gaming rules would apply the different hands, as is described above.

The lights 1010 could also be placed under the different wagering areas 112, 114 at each gaming position 110, with the light under the selected area being illuminated. Thus, if a player places a bet in the fast-wagering area 114 at a gaming position, the light under that wagering area 114 would be illuminated. The dealer and all observers would need to only identify which of the two wagering areas 114 are illuminated to determine which gaming rules (e.g., fast blackjack or traditional blackjack) has been selected and should be used to play the game for that player.

Figure 11:
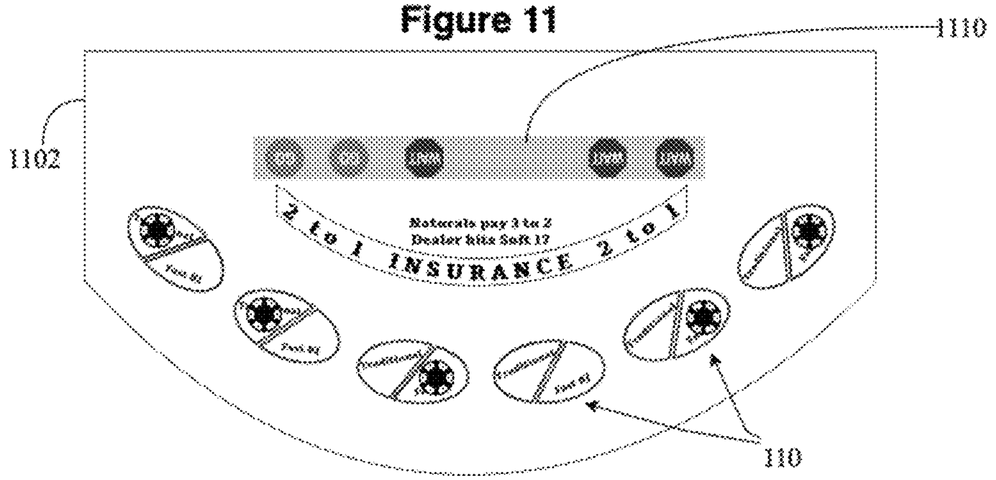
FIG. 11 is the view of the top surface of another embodiment of the gaming table of FIG. 9.

In alternative embodiments, a video screen, electronic display device, or computing device with a built-in screen (such as an Apple iPad), or plurality of such, might be embedded into the table, or placed upon it. FIG. 11 shows a table 1102 that has a computer-controlled display 1110 integrated therein. This display 1110 functions as the visual indicator of the chosen rule set for each gaming position 110, and may be programmed to display an appropriate icon, symbol, or text for each gaming position. Such icon, symbol, or text would, like the lammers or lights described earlier, visually represent, confirm, and communicate the method choice of the player at a gaming position 110. Such displays are also multi-mode indicators, because a single display adjacent a gaming position 110 can indicate different methods of play depending on the icon, text, or other elements presented on the display.

In the embodiments using physical lammers (FIGS. 6 through 9), it would be expected that the dealer would manually place such lammers appropriately for each player wager or hand. In the embodiments using lights (FIG. 10), or one or more electronic display units (FIG. 11), such lights 1010 or displays 1110 may be arranged to be either manipulated and controlled by the dealer, or be manipulated and controlled by sensors within or near the tables 1002, 1102.

Figure 12:
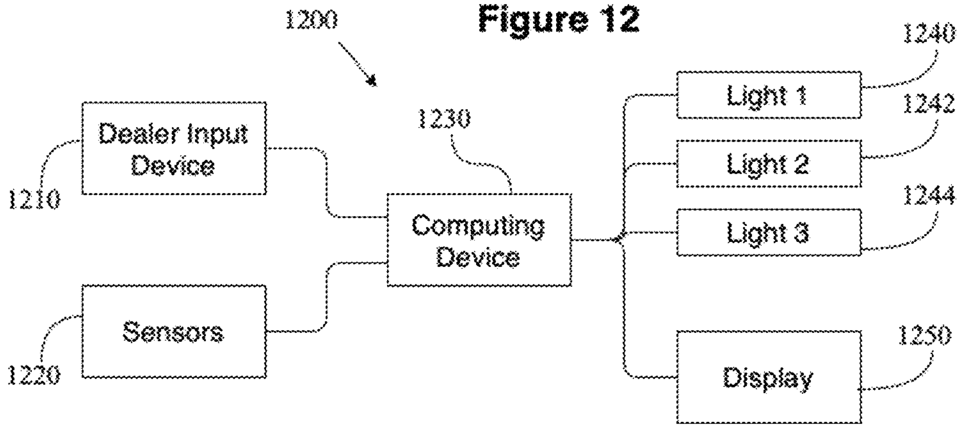
FIG. 12 is a schematic view of the elements of a visual indicator system of the type presented in FIGS. 10 and 11.

This is accomplished by integrating an indicator system 1200, as shown in FIG. 12, into one of the tables 1002, 1102. The dealer can control the lights 1010 or display 1110 by providing input through an input mechanism 1210 into the table 1002, 1102 of the choices made at each gaming position 110. This dealer input 1210 could take the form of a button that is pressed, a touch-sensitive pad that is touched, a switch that is flipped, a foot pedal that is pressed, or, if the display 1110 is touch-sensitive, a touch on the display 1110.

In the sensor input embodiments, the lights 1010 or display 1110 are controlled by sensors 1220 such as optical readers, RF (radio frequency) detectors, weighing mechanisms, and/or computing devices that sense the initial placement of chips on the tables 1002, 1102. If the initial bet is placed on the fast-wagering area 114, the sensors 1220 would detect the presence of the chips in that wagering area 114. Similarly, if the bet tokens are placed on the traditional wagering area 112, that would be detected. Even when sensors 1220 are present in the system 1200, it is likely that dealer input devices 1210 would still be present to allow the dealer to confirm or correct the determinations of the sensors 1220.

Input signals from the dealer input device 1210 and/or the sensor(s) 1220 is fed to a computing device that manipulates the lights 1010 or display 1110 on the table 1002, 1102. The computing device 1230 may be a stand-alone, self-contained computing device, such as a tower, rack, or laptop computer; a mobile device such as a tablet computer or smart phone; or any other type of processor that is programmed to respond to one or both of the inputs 1210, 1220. The computing device 1230 responds to the signals from inputs 1210, 1220 and, in turn, sends control signals to the lights 1010 (represented by three lights 1240, 1242, 1244 in FIG. 12) and/or the display 1110 (shown as display 1250 in the figure). In some embodiments, the control of these lights 1240, 1242, 1244 and/or the display 1250 by the computing device 1230 may be performed automatically based on the signals received from the sensors 1220 without human intervention. In other embodiments, the signals from the sensors 1220 may be overridden or otherwise controlled by the dealer input received by device 1210. While a typical embodiment may include only the lights 1240-1244 or the display 1250, incorporating both into a single table 1002, 1102 is also contemplated.

Other embodiments may rely on the players themselves to properly set the status of the visual communication apparatus prior to the commencement of dealing. This might require the addition of a player input mechanism into the system 1200 and would also require the confirmation by the dealer of the selections through dealer input 1210.

In all embodiments, the signal or display of the apparatus 1200 must be able to be manipulated or changed in the middle of a round of play. This is described above in connection with the double-down decision made by the player, and is also discussed in more detail below. Because of this possibility, the dealer must be able to use the dealer input device 1210 to provide input into the system 1200 about changes to the current status of the game. This can occur during a hand of play, or after the hand is played and the previously selections are wiped clean before new inputs are received for the next hand.

While the above description utilizes the visual indicators (apparatus 1200 or lammers 316) to distinguish between two methods of blackjack, it is anticipated that the above-described systems could also be used to distinguish between two entirely different gambling games. These systems can be especially useful in scenarios where all active players compete against a common hand, but each player can select between different rule sets.

Method Utilizing the Table and Apparatus

On a conventional blackjack table, there is a single dealer hand (sometimes known as a "banker" hand) that is the common opponent of all player hands. Player hands are never in competition with each other. This remains true even when some players at the table have chosen slow blackjack while others have chosen fast blackjack during the same round of play. Slow blackjack players must make hit or stand decisions based on incomplete information, as the dealer's hand is hidden except for one exposed card. These players do not take any actions after the dealer hand is complete. Meanwhile fast blackjack players take most, if not all, actions after the dealer's hand is fully exposed. In exchange, the fast blackjack players have accepted additional restrictions on their play options in order to take advantage of the benefits that arise from full knowledge of the dealer's hand's final point value.

The dealer's primary challenge is that some players, as stated, will perform hitting and standing early in the game, while others will perform it later, and the dealer must act accordingly. The visual communication system 1200 and the lammers 316 specifically exist to aid with this and to provide a reference point for the dealer, rather relying on memory or other cues.

Figure 13:
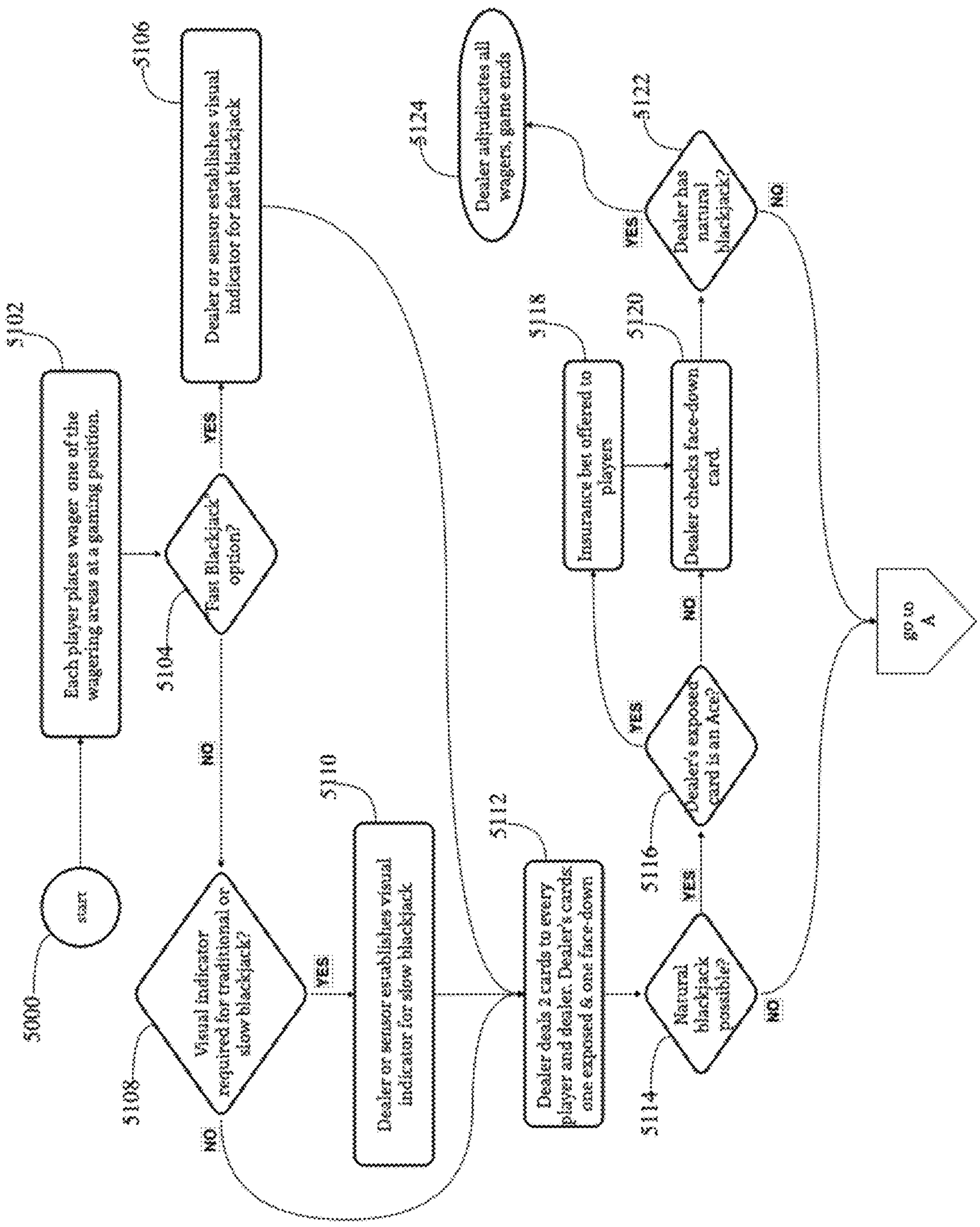
FIG. 13 is a flow chart showing a first portion of a method for use.
Figure 14:
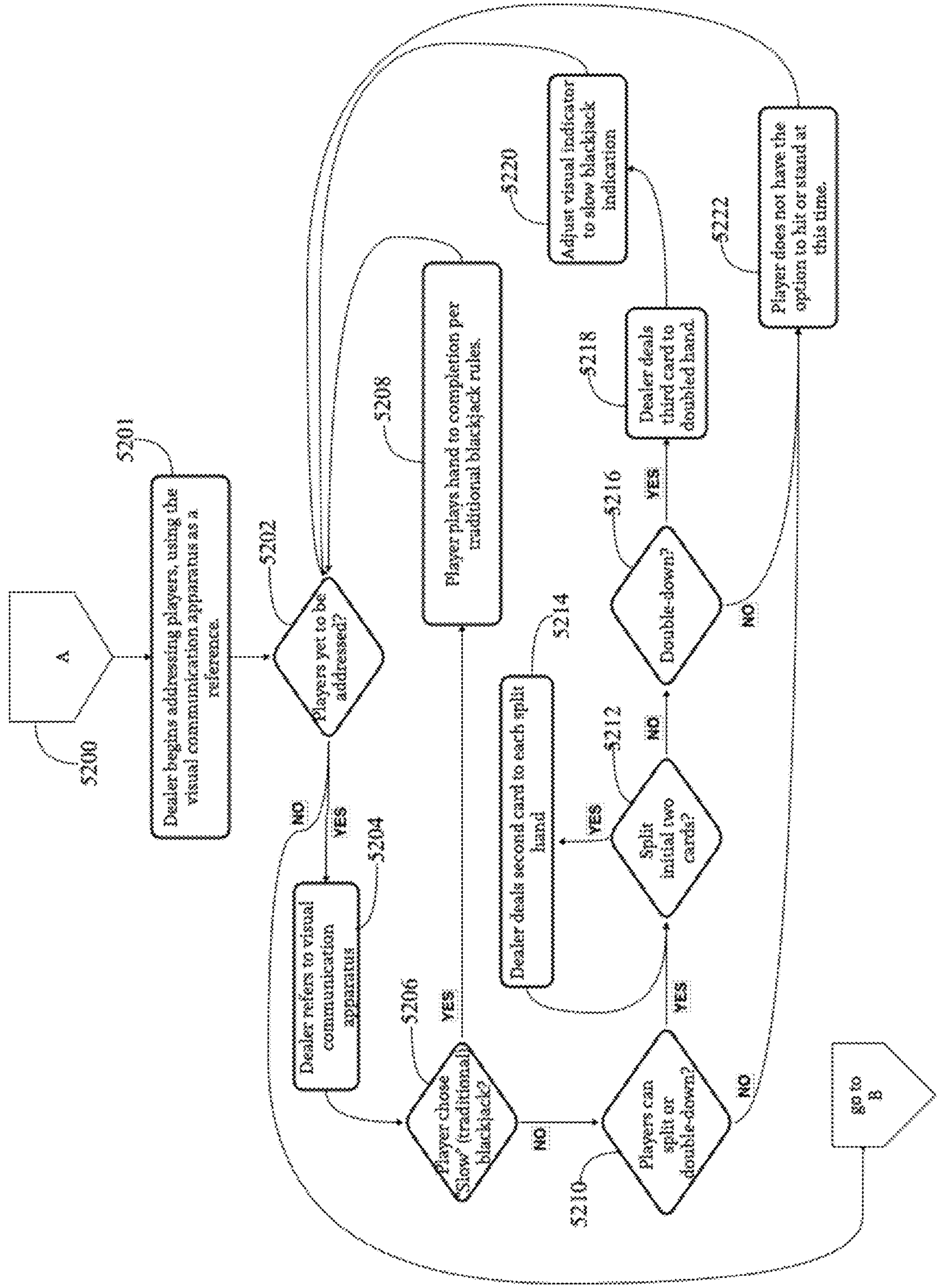
FIG. 14 is a flow chart showing a second portion of the method of FIG. 13.
Figure 15:
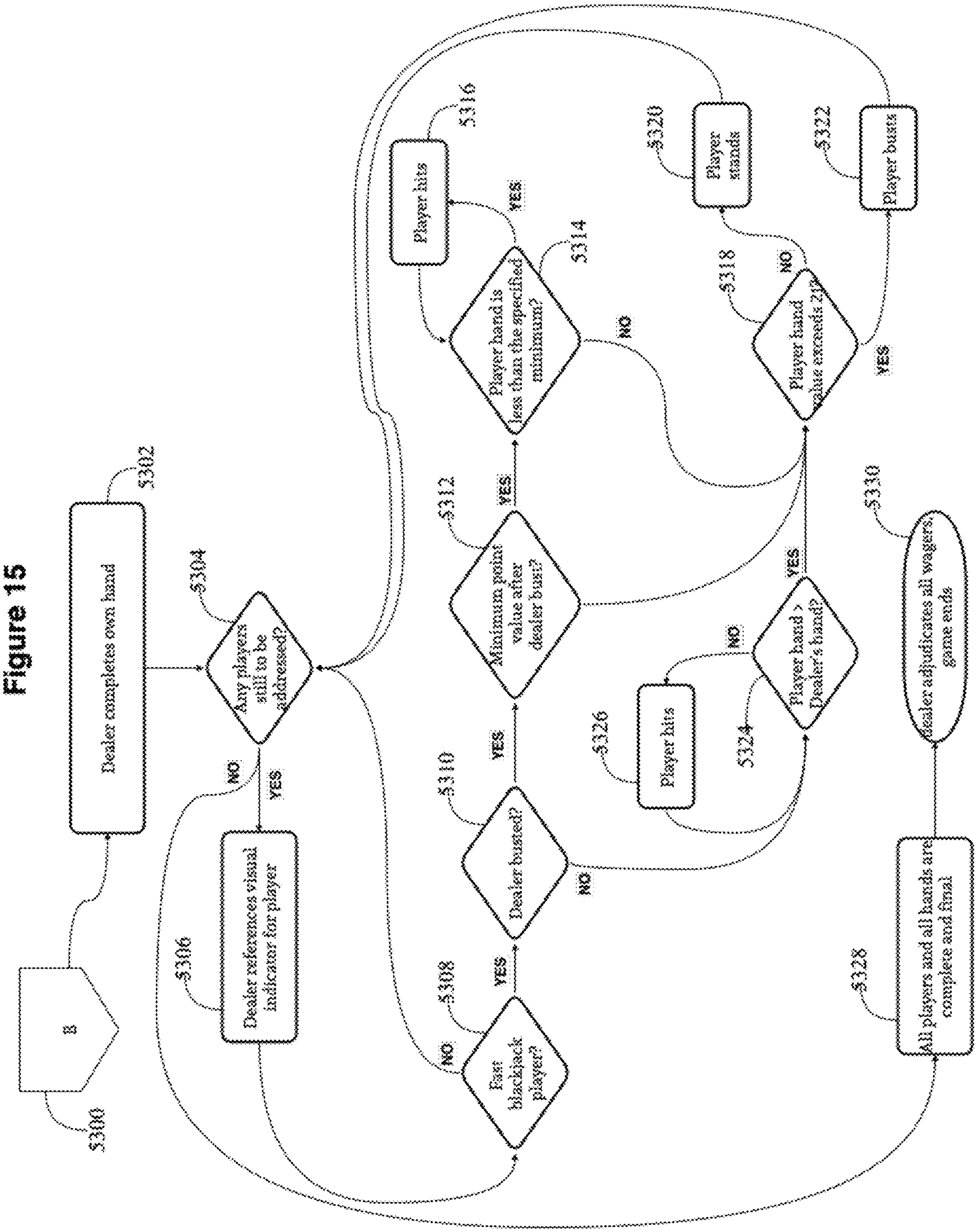
FIG. 15 is a flow chart showing a third portion of the method of FIG. 13.

A method 5000 for administering and dealing both blackjack methods simultaneously to players who may have chosen different rule sets is shown in FIGS. 13, 14, and 15. FIG. 13 shows the start of the method 5000, while FIG. 14 shows the middle and FIG. 15 shows the end of the method 5000.

A round of play begins when one of more players makes a wager, by placing gaming chips or tokens or cash on a designated wagering area 112, 114 (step 5102). If the bet is placed in wagering area 114 that corresponds to the "Fast Blackjack" option (as determined by step 5104), the visual communication apparatus 1200 shall be activated or utilized such that it indicates the player's choice of "Fast Blackjack" (step 5106). In some embodiments, that is accomplished by the dealer placing a lammer 316 on the player chips, while in others, the dealer uses dealer input 1210 to a light 1240-1244 on or prepare a device screen 1250, while in still other embodiments, a system of sensors 1220 will recognize the player's choice and alter the lights 1240-1244 or display 1250 appropriately.

If the player chose the "Slow Blackjack" option, the next action depends on the embodiment, as determined by step 5108. Some embodiments require a visual identification of the selected gaming rules for every gaming position 110 regardless of choice, while other embodiments consider the absence of the display or activation of the visual communication apparatus as an indication of the traditional or slow blackjack method. In embodiments where the visual communication apparatus is always activated or displayed, then the visual communication apparatus shall be activated or displayed such that it indicates the player's choice of slow blackjack" at step 5110. If step 5108 indicates that such an indicator is not needed, the step 5110 is skipped. Steps 5106, 5110 ensure that the dealer and other game observers can easily distinguish a wager corresponding to the fast blackjack option from one corresponding to the slow blackjack option.

The dealer then begins dealing at step 5112. The dealer distributes two cards to each participant, including itself. In most embodiments, the player cards shall be dealt face-up. In all embodiments, one dealer card shall be face-up and one shall be face-down. If the dealer's face-up card is an Ace or card with a point value of 10 (King, Queen, Jack, 10), then a natural blackjack is possible, which is determined at step 5114, and the dealer will have to check if its hand is in fact a natural blackjack before dealing any more cards. If the face-up card is an Ace (checked at step 5116), most embodiments will offer an insurance bet to the players at step 5118. This bet is offered at nearly every blackjack table in the United States and pays when the dealer does have a natural. Next, the dealer will check its face-down card at step 5120, with the assistance of an electronic card reader in many embodiments. If step 5122 determines that the dealer does in fact have a natural blackjack, the game is "short-circuited" and ends immediately at step 5124 because no player hand can beat a natural blackjack. In this case, players who also have a natural blackjack will tie and have their initial wager returned, while all other players lose. If the dealer does not have a natural blackjack, the game continues on to the next stage. At this point, the method 5000 continues at box "A" 5200 shown in FIG. 14.

FIG. 14 beings with the dealer addressing the players in turn at step 5201. The dealer does this by first determining whether there are players any players (yet) to address at step 5202. If so, the dealer addresses the next player and refers to the visual communication device (or lack thereof) established at steps 5106 and 5110 to confirm the player's wagering choice at step 5204. If the visual communication device confirms the player chose traditional or slow blackjack, then the player shall play the hand to completion at step 5208. This step 5208 includes the full complement of normal blackjack options, including doubling-down, splitting (when card values match), hitting, and standing. After step 5208 for this player, the dealer will seek to address the next player (back to step 5202).

Some embodiments will not restrict fast blackjack players from splitting or doubling-down prior to the dealer revealing its face-down card, just like traditional blackjack players. If the visual communication apparatus confirms the player chose fast blackjack, step 5210 is to determine whether the current embodiment of the method 5000 is one in which those options remain available. If so, and if the values of the player's two cards are identical, the player is given the option to split at step 5212. If a split is elected, the dealer shall separate the cards into distinct hands and deal a second card to each at step 5214. Most embodiments that allow splitting allow a player to do so multiple times, if one or more of the newly split hands also has both cards with equal value.

The player may also choose to double-down at step 5216. If the player elects this option, the dealer shall immediately deal a third card to the hand at step 5218. However, as normal doubling-down rules dictate, no further hitting of the hand is allowed. Because of this, despite choosing to play "Fast Blackjack," the player will not have the opportunity to hit the hand after the dealer completes its hand. To reflect this restriction, the dealer at step 5220 adjusts the indication of the visual communication apparatus such that it now reflects "Slow Blackjack." Slow blackjack players, like the current player that elected to double-down at step 5216, may not hit after the dealer completes its hand. The change of the indicator at step 5220 is generally done manually, as it takes place after a decision by the player that could not be detected through sensors 1220. Thus, even a system 1200 that utilized sensors 1220 would have to allow the dealer to use the input 1210 to modify the indicator for a particular gaming position 110. After this, the player's turn is done, and the dealer shall look to address the next player (back to step 5202).

If the player did not choose to double-down at step 5216, or the embodiment restricts fast blackjack players from splitting or doubling entirely at step 5210, the player retains the opportunity to hit or stand later, but not presently, as shown at step 5222 in FIG. 14. Instead, the dealer addresses the next player at step 5202. When there are no more players to address (as determined by step 5202), the method continues at step "B" on FIG. 15.

FIG. 15 shows the completion of method 5000 starting at block "B" 5300. The next step 5302 is for the dealer to reveal its face-down card and complete its hand following conventional blackjack rules and procedures. Afterwards, the dealer needs to address the remaining fast blackjack players, who have yet to been given an opportunity to hit their hands. This is accomplished by addressing each player in turn through step 5304. If this step determines that there are any players yet to be addressed, the dealer confirms the next player's choice of game method by referencing the visual communication apparatus at step 5306. If the indicator does not indicate a fast blackjack player, as determined by step 5308, the dealer can immediately proceed to the next player by returning to step 5304.

If step 5308 determines that the player is a fast blackjack player, the next action at step 5310 considers whether the dealer had busted, that is, finished with a hand total exceeding 21. If the dealer did bust, the next action 5312 will determine whether the embodiment (gaming rules being played) has specified a minimum point value players must meet after a dealer has busted. If such a minimum exists, and the player's hand's point value is below the minimum (step 5314), then the player must accept a hit at step 5316, and the updated hand is re-evaluated back at step 5314, with the cycle of hits being repeated if necessary. Once the hand meets or exceeds the minimum, then, if the hand's value is not above 21 (step 5318), the player shall stand (step 5320). If the hand's value is above 21 (determined at step 5318), the player's hand is a bust as shown at step 5322.

If the dealer busted but the embodiment does not enforce any mandatory minimum point value for player hands at step 5312, the player shall not hit, but the player's hand shall immediately be determined at 5318 if the hand is a stand (5320) or bust (5322). If the dealer did not bust (as determined at step 5310), then the player hand's point value is compared to that of the dealer's hand at step 5324. If the player's hand is lower than the dealer's, it is presently in a losing situation so the only option is to hit (step 5326) in an attempt to win, and this cycle may repeat. Once the player's hand exceeds the dealer's (step 5324), the player's hand is evaluated at 5318 to determine if the player shall stand (5320) or the hand is a bust (5322). Any time the player stands (5320), or its hand is determined to be a bust (5322), that player's hand is complete, and the dealer shall seek to address the next player at step 5304. Once the dealer has addressed all players, all the hands are final, and the game is over at step 5328. The only step left is to adjudicate all the hands at step 5330, which includes paying out winning bets and collecting losing bets, collecting all the cards, and preparing to start again.

Method 5000 addresses a potential conflict between the reading of the visual indicator after a fast blackjack player has doubled-down at step 5218, in embodiments where the option to double down has not been eliminated or restricted. The conflict is that the player forfeits the right to any additional hits when he or she exercises the double-down option, while fast blackjack players normally may take hits after the dealer completes its hand. In some situations, such as after a dealer bust, when the player hand is below a specified minimum, the fast blackjack player is normally mandated to hit, while the double-down decision forbids doing so. This conflict can be resolved by ensuring that the forfeiting of future hits from doubling-down shall supersede all restrictions against standing implemented by the fast blackjack process. However, because the visual communication apparatus signals fast blackjack, an observer, including the dealer, would likely assume that the player is entitled or mandated to take hits after the dealer completes its hand. Therefore, because the fast blackjack player who exercises the double-down option will not, in fact, take any future hits, it is important that the dealer adjust the visual communication apparatus so that it now signals slow blackjack at step 5220. By doing so, the dealer, referring to the indicator, will simply skip the player in the final stage (at step 5308), and surveillance observers will not be confused when the player, for example, does not hit in a situation where a fast blackjack player normally would.

A person with ordinary skill in the art will recognize that the embodiment as described so far is not viable in a casino environment, where it is mandatory that the inherent mathematical edge favors the casino. The players' knowledge of the final value of the dealer's hand prior to hitting or standing shifts the advantage to the players. This lack of viability can be solved in a way that furthers the stated goals of speeding up the game and reducing player decisions, by restricting options or choices normally afforded to the players.

The largest change in the mathematical edge arises from the elimination of the possibility of the player busting prior to the dealer. When a blackjack player "busts," that is, his or her hand exceeds a point value of 21, the player loses the associated wager, even if the dealer also busts on the same hand. In an embodiment where the dealer completes its hand before the players do, players can easily avoid ever busting after a dealer does by always standing. The preferred embodiment, therefore, restricts players from standing after a dealer bust while the player's hand is lower than a predefined minimum point value, such that a player cannot entirely avoid busting after dealer busts. This occurs at steps 5312-5316, as described above. Some embodiments will use a point minimum sufficiently high as to shift the implementation's mathematical edge back to viability on its own. Other embodiments may do so with a combination of a point minimum and additional restrictions on player options.

An option that embodiments may eliminate is the option to stand whenever a player's hand is tied with the dealer's hand. Removing this option has multiple benefits. A common source of indecision is eliminated, whether to accept a tie or take a risk and try to win the hand. Eliminating this point of decision, like any other, speeds up the game. The mandate also eliminates the "dead time" associated with hands resulting in a tie, as mentioned earlier. The elimination of such ties is assured in the method described above at step 5324.

Another option that embodiments may eliminate is the option to value an Ace in a player's hand as 1 point. A common source of indecision in blackjack is based around the variable value of an Ace, sometimes 1 and other times 11. Eliminating the value of 1 point also eliminates this indecision.

Other options that embodiments may eliminate are the options for a player to increase his or her initial wager through the conventional blackjack processes of "splitting" hands or "doubling-down." The elimination of these options, like all the other restrictions described so far, speeds up the game by removing points of decision and uncertainty. This option would remove steps 5210-5220 from method 5000, and the method would always immediately skip ahead to 5222 for every fast blackjack player.

It is anticipated that practitioners with ordinary skill in the art will combine and customize some or all of the new methods and restricted options listed above to create new embodiments. Some anticipated examples of such embodiments may include:

- no standing below 17 after dealer bust, no splitting or doubling-down permitted;
- no standing below 16 after dealer bust, players may not stand on ties, no splitting or doubling-down permitted; and
- no standing below 14 after dealer bust, players may not stand on ties, players may not value Aces as one point, but allow conventional splitting and doubling-down prior to dealer completing its hand.

A person with ordinary skill in the art can verify that these embodiments have an inherent mathematical edge in favor of the casino, and are therefore viable in a casino environment, and can calculate the mathematical edge inherent in other potential embodiments.

Offering a Novel Method for Increasing the Pace of Play of a Blackjack Embodiment on a Computer or Network of Computers The embodiments described earlier assume a physical embodiment, where blackjack is played in a real-world casino with physical materials. As online and video gambling becomes legal in more and more jurisdictions throughout the United States, and as gamblers become more comfortable with gambling online, virtual, online, and/or mobile implementations of the novel blackjack method increase in urgency.

Figure 16:
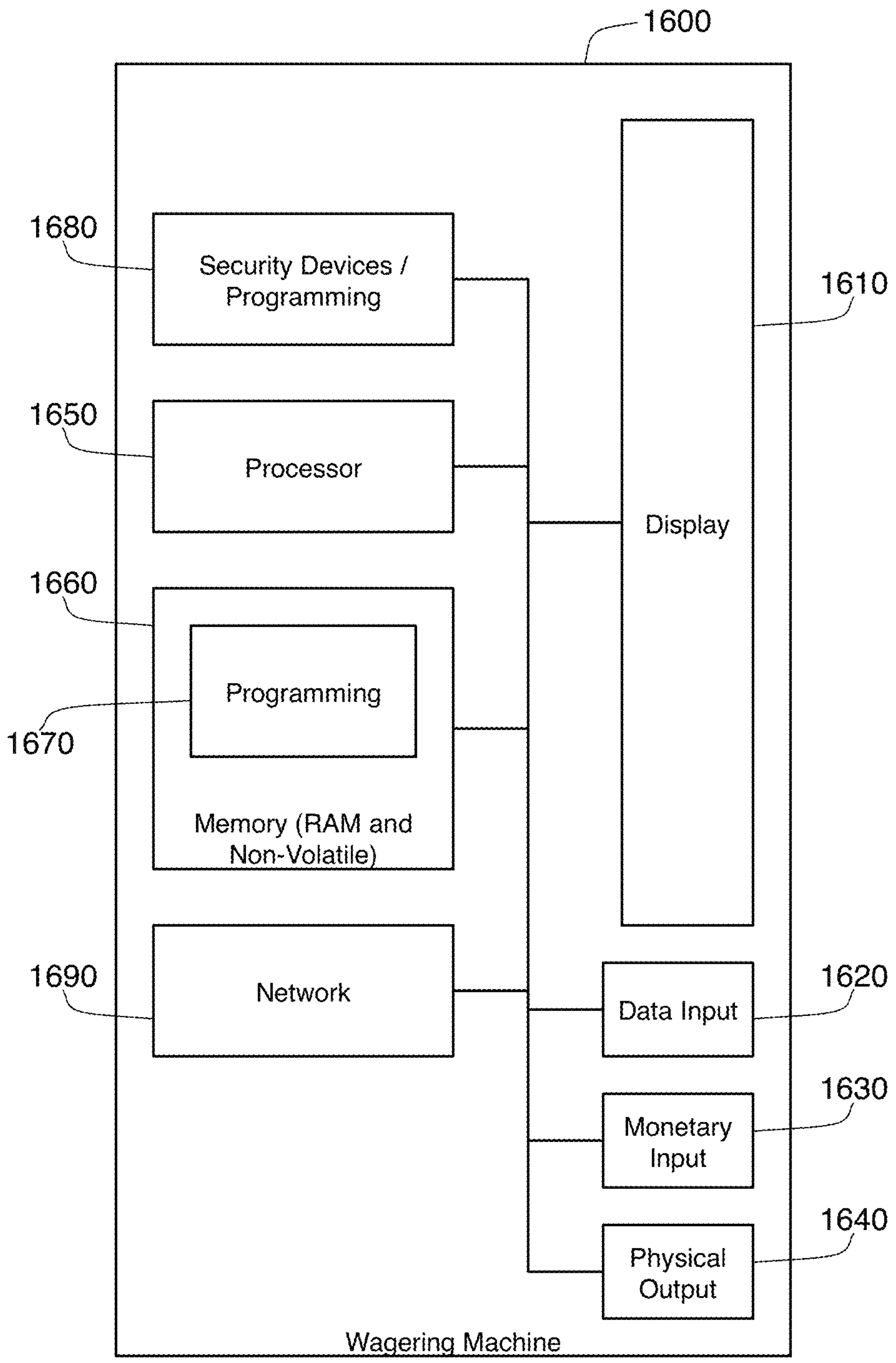
FIG. 16 is a schematic view of a wagering machine utilizing the method of FIGS. 13-15.

FIG. 16 shows a virtual wagering machine 1600. The machine 1600 is of the type to be used in a casino environment as a gaming machine. The machine 1600 includes a display 1610, which can take the form of a standard LCD or LED display, but may also take the form of a touch-screen display. User input 1620 receives input from the user of the machine 1600, such as through buttons, a keypad, a separate touchscreen, or even the touchscreen that forms the display 1610.

Monetary input 1630 can take the form or a bill or coin reader that can identify and accept legal tender or accept casino-specific bills, certificates, or coin tokens. The monetary input 1620 functions as a validator of payment made to play the machine 1600. In one example, tickets can be created that contain credits, and the monetary input 1630 can take the form of a ticket reader, such as a bar-code or mag-stripe reader. The monetary input 1630 can also accept a credit card, a casino payment card, or a loyalty card. The monetary input 1630 may comprise only the physical interface that reads the tokens, cards, bills, or coins, with the validation and other processing associated with payment occurring at other locations within the machine 1600. In other embodiments, the monetary input 1620 shown in FIG. 16 can be consider a "module" that contains programming and runs on a processor that is shared with other portions of the machine 1600.

The physical output 1640 can output physical media external to the machine 1600. In some cases, the physical output 1640 is a printer that prints a ticket or cashless voucher on a slip of paper, which is then associated with a certain amount of credit or currency. The paper may contain a bar code or QR code that can be read by optical scanners. In other embodiments, the physical output 1640 outputs a magnetic stripe ticket that contains a code on a magnetic stripe. These codes can then be used by the player to play other machines or to "cash out" so as to convert the credits to legal currency.

The display 1610, data input 1620, monetary input 1630, and printed output 1640 are in communication with, and under the control of, a processor 1650. The processor 1650 can be standard central processing unit (or CPU) or can be a specially programmed processor. The processor 1650 is in communication with memory 1660, which in this context may constitute random access memory (or RAM) and non-volatile memory such as flash storage devices, other solid-state devices, magnetic disks, or ROMs. On the memory 1660 is computer programming 1670, which comprises instructions that are read by the processor 1650 and are used to control the processor 1650. The programming 1670 may, for instance, create a visual presentation on the display 1610, receive data through data input 1620, verify the receipt of payment through the monetary input 1630, and control the material that is output through the physical output 1640.

Because the wagering machine 1600 is a gaming machine for use in, for example, a casino environment, the machine 1600 must be secured against tampering. This is accomplished using, for instance, security programming or a security device 1680, also known as a security mechanism 1680. The security mechanism 1680 may comprise, for example, a chip that secures trusted information in an encrypted matter to prevent misuse, or a monitoring device that monitors and records any tampering attempts made to the other programming 1670.

Finally, network hardware 1690 links the wagering machine 1600 to a network of other wagering machines 1600, to local servers (not shown), and to remote servers accessed over a wide area network (such as the Internet). The network hardware 1690 can be involved in a variety of processes, such as the verification of monetary input received through 1630, the debiting of accounts upon the playing of games on the wagering device 1600, the communication of play statistics to a central server, and the reporting and confirmation of winnings won on the machine 1600.

Figure 17:
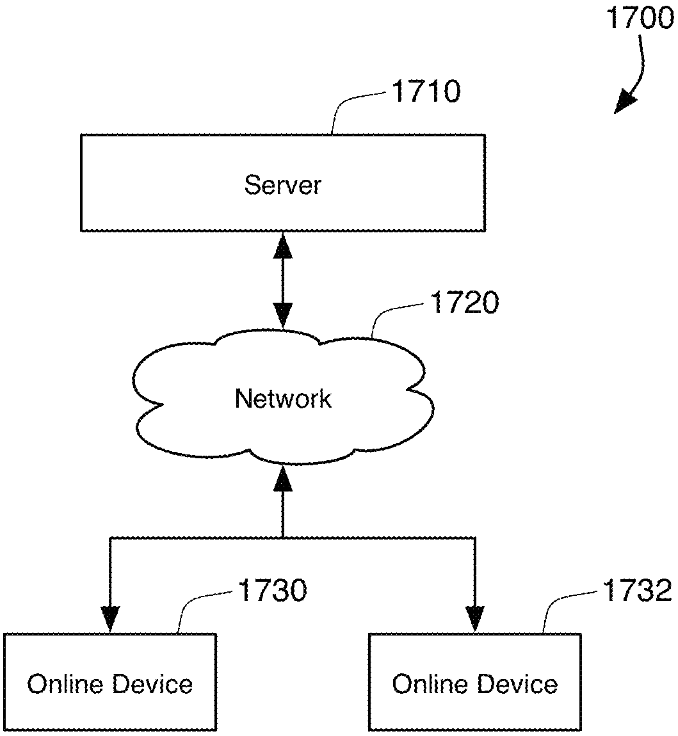
FIG. 17 is a schematic view of a system for allowing remote use of the method of FIGS. 13-15.

The wagering machine 1600 is capable of presenting a virtual gaming process using method 5000 shown in FIGS. 13-15. FIG. 17 shows a system 1700 in which a similar virtual administration of method 5000 is performed by a game server 1710, which communicates information over a network 1720 to remote computing devices 1730, 1732. It is anticipated that a player using system 1700 will interface with computing device 1730 or 1732, which may take the form of a desktop or laptop computer, mobile phone, a tablet, a watch, virtual reality headset, or other client computing device. The game server 1710 in this system 1700 is responsible for executing similar programming as the programming 1670 described above for the wagering machine 1600. Game information similar to that presented through display 1610 on device 1600 will be sent via network 1720 to the online devices 1730, 1732, which will transform the information into a presentable form, often resembling a casino gaming environment, for presentation to human players at those devices, and data inputs similar to those received by the wagering machine 1600 at input 1620 will be sent by the online devices 1730, 1732 across the network 1720 to be received by the game server 1710. The computers or devices 1710, 1730, 1732 will communicate over a network, which may be a private network or may be the public Internet. Like the wagering machine display 1610, the local devices 1730, 1732 will produce a visual representation of the cards and chips and tables typical of a real-world casino environment which the player can view and with which the player can interact. The online devices 1730, 1732 can present the interfaces and receive input through the user through a standard web browser, or through specially programmed applications (or apps) that operate on the online devices 1730, 1732 and communicate over the network 1720 with the server 1710.

It is worth noting that online casinos that utilize systems such as system 1700 are not constrained by physical space limitations, nor do they rely on human labor to deal cards at each table. A player who wishes to change tables does not have to physically leave his or her seat and move to the new table's location, they can switch virtual "tables" with a few button presses or clicks or screen taps. The same can be true of the user of a wagering machine 1600 inside of a casino.

In this environment, embodiments that offer slow and fast blackjack at a single table may not realize any efficiency gains. Therefore, it is anticipated that some embodiments will offer both methods at a single virtual table to replicate the preferred real-world embodiment, and other embodiments will not attempt to combine the two methods at a single table, and instead offer each method at its own distinct virtual table.

In implemented process 5000, a computer acting as a game server 1710, or the processor 1650 of the wagering machine 1600 will establish a data set representing cards comprised of those in a standard fifty-two card deck, and then perform the functions that replicate shuffling and distributing playing cards in a randomized and non-predictable fashion. The server computer 1710 or processor 1650 will communicate the values of each individual card to the player (through the local device 1730, 1732, or through the display 1610), and will determine the results of hand adjudication and the player's account balance. Inputs relating to the player's wagers, choices, and decisions during the course of the game can similarly be received from the online devices 1730, 1732 or through the data input 1620. As such, it is possible to gamble real money or other items, real or virtual, of value.

Although the machine 1600 and the system 1700 implement method 5000 virtually, such implementations will follow the steps outlined above, as well as the player restrictions, such that the player has the same gaming experience playing on a computerized environment than he or she would have at a real-world physical casino. For example, the machine 1600 or system will utilize visual methods that confirms the player's game choice. Such confirmations may appear similar to a real-world implementation, such as lammers, lights, or virtual sub-displays (that mimic display 1110). Alternatively, more creative representations can be used. For example, an embodiment might draw the entire table surface in a shade of red during the stage in which the player is not allowed to "hit," then redraw the entire table surface in a shade of green during the stage in which the player may hit. Another embodiment may display such indicators or a virtual indicating apparatus in such a way as to appear to float in mid-air above the gaming table. Despite not having a human dealer, the representation of the visual apparatus is useful for the player, and for any observers of the game, even if those observers may be doing so through a computer not involved in the game itself, and may be at a later time. Any representation of a visual indicator showing the election of a rule set must retain the capability to have its signal changed during a game, in response to specified scenarios or series of events, just as the real-world apparatus does as described above.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A system comprising:

a) a gaming table defining a plurality of gaming positions, wherein, at each gaming position, the gaming table comprises:

i) a first wagering area visible on the gaming table identifying a first rule set for play at the gaming position, and ii) a second wagering area visible on the gaming table identifying a second rule set for play at the gaming position, wherein the second rule set differs from the first rule set;

b) a plurality of bet tokens comprising:

i) a first set of bet tokens at a first set of gaming positions where the first set of bet tokens are positioned at the first wagering area, and ii) a second set of bet tokens at a second set of gaming positions where the second set of bet tokens are positioned at the second wagering area, wherein there is no overlap in the first set of gaming positions and the second set of gaming positions, further wherein the first set of gaming positions has no bet tokens positioned at the second wagering area and the second set of gaming positions has no bet tokens positioned at the first wagering area; and c) a first set of visual indicators in addition to the bet tokens and the wagering areas, wherein at least one visual indicator in the first set of visual indicators is adjacent to each of the first set of gaming positions, and none of the first set of visual indicators are adjacent to any of the second set of gaming positions;

wherein a presence of any of the first set of visual indicators adjacent to a selected gaming position indicates that the first rule set governs play at the selected gaming position at a first time;

wherein an absence of any of the first set of visual indicators adjacent to a particular gaming position indicates that the second rule set governs play at the particular gaming position at the first time; and wherein, at a second time, a first indicator of the first set of visual indicators is no longer adjacent to a first gaming position to indicate that the second rule set governs play at the first gaming position at the second time.

2. The system of claim 1, wherein a second set of visual indicators are adjacent the second set of gaming positions at the first time, wherein the presence of any of the second set of visual indicators indicate that the second rule set governs play at an adjacent gaming position at the first time.

3. The system of claim 1, wherein the first set of visual indicators comprise lights that are lit adjacent the first set of gaming positions.

4. The system of claim 2, wherein two lights are positioned adjacent each of the gaming positions.

5. The system of claim 1, further comprising:

i) sensors that sense the presence of the bet tokens at the first wagering areas and the second wagering areas, and ii) a computing device that receives signals from the sensors to distinguish between the first set of gaming positions where the bet tokens are positioned at the first wagering area and the second set of gaming positions where the bet tokens are positioned at the second wagering area, wherein the computing device sends signals to the first set of visual indicators based on the signals from the sensors.

6. The system of claim 5, wherein the visual indicators comprise portions of a display embedded within the gaming table.

7. A method comprising:

a) providing a gaming table defining a plurality of gaming positions, wherein, at each gaming positions, the gaming table having:

(1) a first wagering area visible on the gaming table identifying a first rule set for play at the gaming position, and (2) a second wagering area visible on the gaming table identifying a second rule set for play at the gaming position, wherein the second rule set differs from the first rule set;

b) receiving a first set bet tokens at a first set of gaming positions, wherein the first set of bet tokens are positioned at the first wagering area;

c) receiving a second set of bet tokens at a second set of gaming positions, wherein the second set of bet tokens are positioned at the second wagering area, wherein there is no overlap in the first set of gaming positions and the second set of gaming positions;

d) establishing a first set of visual indicators adjacent the first set of gaming positions wherein none of the first set of visual indicators are adjacent to any of the second set of gaming positions, wherein a presence of any of the first set of visual indicators adjacent to a selected gaming position indicates that the first rule set governs play at the selected gaming position; and wherein an absence of any of the first set of visual indicators adjacent to an particular gaming position indicates that the second rule set governs play at the particular gaming position; and e) playing a card-based game where players at the plurality of gaming positions play a card game against a common hand, wherein the players at the first set of gaming positions play according to the first rule set and the players at the second set of gaming positions play according to the second rule set; wherein the card-based game is blackjack, further wherein the common hand is a dealer hand that is completed and exposed with a dealer hand value; and wherein:

i) the first rule set has players hit only after the dealer hand is completed and exposed, and the second rule set requires players to hit only before the dealer hand is completed and exposed, ii) when the dealer hand value is not bust, the first rule set requires players to hit if a current hand value of a player is not greater than the dealer hand value, further wherein the first set of visual indicators identify which hands are to be hit after the dealer hand is completed and exposed, and iii) when the dealer hand value is bust, the first rule set requires players to hit if the current hand value of the player is less than a minimum value.

8. The method of claim 7, wherein the first rule set allows players to split identical cards before the dealer hand is completed and exposed, wherein both split hands play under the first rule set.

9. The method of claim 8, a particular player playing under the first rule set doubles-down, in which case the particular player receives one additional card and the hand is moved to the second rule set so as to not allow any hits after the dealer hand is completed and exposed.

10. The method of claim 9, wherein a particular visual indicator for the particular player is changed after the particular player doubles-down so that it is not part of the first set of visual indicators.

11. The method of claim 10, wherein a second set of visual indicators are adjacent the second set of gaming positions, wherein the presence of any of the second set of visual indicators indicate that the second rule set governs play at an adjacent gaming position, further wherein the particular visual indicator for the particular player is part of the second set of visual indicators after the particular player doubles-down.

12. The method of claim 7, wherein a second set of visual indicators are adjacent the second set of gaming positions, wherein the presence of any of the second set of visual indicators indicate that the second rule set governs play at an adjacent gaming position.

13. The method of claim 12, wherein a multi-mode indicator adjacent each gaming position operates in a first mode when it is a member of the first set of visual indicators and in a second mode when it is a member of the second set of visual indicators.

14. The method of claim 7, wherein the first set of visual indicators comprise lammers that are positioned adjacent the first set of gaming positions.

15. The method of claim 7, further comprising: sensing through sensors the presence of the bet tokens at the first wagering areas and the second wagering areas, transmitting signals from the sensors to distinguish between the first set of gaming positions where the bet tokens are positioned at the first wagering area and the second set of gaming positions where the bet tokens are positioned at the second wagering area, and sending signals to the first set of visual indicators based on the signals transmitted from the sensors.

16. The system of claim 1, wherein the first set of visual indicators are embedded in the gaming table adjacent the first wagering areas and the second set of visual indicators embedded in the gaming table adjacent the second wagering areas, further comprising:

d) a first set of sensors that sense the presence of the bet tokens at the first wagering areas and a second set of sensors that sense the presence of bet tokens at the second wagering areas, wherein the first set of visual indicators are responsive to signals from the first set of sensors, further wherein the second set of visual indicators are responsive to signals from the second set of sensors.

17. A method comprising:

a) providing a gaming table defining a plurality of gaming positions, wherein, at each gaming positions, the gaming table having:

i) a first wagering area visible on the gaming table, ii) a second wagering area visible on the gaming table, and iii) a first visual indicator;

b) receiving, at a first set of gaming positions, a first set of bet tokens that are positioned at the first wagering area while no bet tokens are positions at the second wagering area at the first set of gaming positions;

c) receiving, at a second set of gaming positions, a second set of bet tokens that are positioned at the second wagering area while no bet tokens are positioned at the first wagering area at the second set of gaming positions;

d) illuminating the first visual indicators at the first set of gaming positions while not illuminating the first visual indicators at the second set of gaming positions, wherein the illumination of the first visual indicator indicates that a first rule set governs play for the gaming position; and wherein a lack of illumination of the first visual indicator indicates that a second rule set governs play for the gaming position, wherein the second rule set differs from the first rule set; and e) playing a card-based game where players at the plurality of gaming positions play the card-based game against a common hand, wherein the players at the first set of gaming positions play according to the first rule set and the players at the second set of gaming positions play according to the second rule set.

18. The method of claim 17, wherein one of the rule sets allows players to split identical cards.

19. The method of claim 18, further comprising changing the illumination of the first visual indicator at a particular gaming position upon a split of identical cards to indicate a change of rule sets for the particular gaming position.

20. The method of claim 17, wherein the gaming table has a second visual indicator at each gaming position, further comprising illuminating the second visual indicators at the second set of gaming positions while not illuminating the second visual indicators at the first set of gaming positions.

* * * * *